(12) United States Patent
Hershberger

(10) Patent No.: US 12,263,726 B2
(45) Date of Patent: Apr. 1, 2025

(54) VEHICLE WITH SLIDING DOOR

(71) Applicant: MORGAN OLSON CORPORATION, Sturgis, MI (US)

(72) Inventor: Dustin Hershberger, Wolcottville, IN (US)

(73) Assignee: Morgan Olson Corporation, Sturgis, MI (US)

( * ) Notice: Subject to any disclaimer, the term of this patent is extended or adjusted under 35 U.S.C. 154(b) by 355 days.

(21) Appl. No.: 17/684,978

(22) Filed: Mar. 2, 2022

(65) Prior Publication Data

US 2022/0281297 A1    Sep. 8, 2022

Related U.S. Application Data

(60) Provisional application No. 63/155,344, filed on Mar. 2, 2021.

(51) Int. Cl.
| | |
|---|---|
| *B60J 5/06* | (2006.01) |
| *B60J 5/10* | (2006.01) |
| *E05D 15/06* | (2006.01) |
| *B60R 21/02* | (2006.01) |

(52) U.S. Cl.
CPC ............... *B60J 5/06* (2013.01); *B60J 5/107* (2013.01); *E05D 15/063* (2013.01); *E05D 15/0652* (2013.01); *E05D 15/0656* (2013.01); *B60R 21/026* (2013.01); *E05Y 2201/64* (2013.01); *E05Y 2201/684* (2013.01); *E05Y 2201/688* (2013.01); *E05Y 2900/516* (2013.01); *E05Y 2900/518* (2013.01); *E05Y 2900/531* (2013.01)

(58) Field of Classification Search
CPC ... B60J 5/06; B60J 5/062; B60J 5/0486; B60J 5/50487; E05D 2015/1055; E05D 15/0652; E05D 15/0656
See application file for complete search history.

(56) References Cited

U.S. PATENT DOCUMENTS

| | | | |
|---|---|---|---|
| 2,839,331 A * | 6/1958 | Smith | B60J 5/062 49/214 |
| 11,225,185 B1 * | 1/2022 | McGraw | B62D 33/04 |
| 2006/0175867 A1 * | 8/2006 | Heuel | E05D 15/58 296/155 |
| 2009/0315362 A1 * | 12/2009 | Michnik | B60J 5/06 296/155 |

(Continued)

FOREIGN PATENT DOCUMENTS

| | | | | |
|---|---|---|---|---|
| EP | 532982 A1 * | 3/1993 | ............ | E05D 15/06 |
| GB | 709914 A * | 9/1954 | ............ | B60J 5/062 |
| JP | 2001047861 A * | 2/2001 | | |

*Primary Examiner* — Daniel J Colilla
(74) *Attorney, Agent, or Firm* — Ballard Spahr LLP

(57) ABSTRACT

A vehicle (e.g., a class-2 vehicle) with an improved cab door is disclosed. The vehicle can have a vertical plane that bisects the vehicle into a driver's side and an opposed side. The vehicle can comprise a chassis and a body supported by the chassis. The body can define a cab. The cab can define an opening configured to provide operator access to the cab. The cab door can be configured to travel about and between an open position and a closed position along a linear axis. In the closed position, the cab door can at least partially cover the opening of the cab. The linear axis can form an acute angle with the vertical plane that bisects the vehicle.

15 Claims, 7 Drawing Sheets

(56) References Cited

U.S. PATENT DOCUMENTS

2013/0320704 A1* 12/2013 Sumiya ...................... B60J 5/06
                                                    49/506
2017/0210209 A1*  7/2017 Tsubaki ................. E05F 15/60
2022/0219518 A1*  7/2022 Singh ....................... B60J 10/86

* cited by examiner

VEHICLE WITH SLIDING DOOR

CROSS-REFERENCE TO RELATED APPLICATION

The present application claims priority to and the benefit of the filing date of U.S. Provisional Patent Application No. 63/155,344, filed Mar. 2, 2021, the entirety of which is hereby incorporated by reference herein.

FIELD

The present application is directed to vehicles (e.g., delivery vehicles) and, in particular, to sliding doors thereof.

BACKGROUND

Conventional walk-in delivery vehicles (e.g., vans) are often used for delivery of products (e.g., bread, boxed packages, restaurant & linen supplies, snack food, etc.). Such walk-in delivery vehicles are typically equipped with side sliding doors that allow the driver to exit the vehicle to deliver such items. The conventional vans have seals that seal between the door and the body. When the door moving between open and closed positions, the seal is continuously in sliding engagement. That is, the seal is coupled to one of the body or the door, and the seal slides against the other of the body or the door continuously from the closed position to the open position, providing a frictional force that resists movement. Due to the continuous engagement with the seal, movement of these doors requires significant energy and effort from an operator to overcome the frictional force resisting movement, which can lead to fatigue or injury. Accordingly an improved door is desired.

SUMMARY

Described herein, in various aspects, is a vehicle having a vertical plane that bisects the vehicle into a driver's side and an opposed (passenger's) side. The vehicle can comprise a chassis and a body supported by the chassis. The body can define a cab. The cab can define an opening configured to provide operator access to the cab. The cab door can be configured to travel about and between an open position and a closed position along a linear axis. In the closed position, the cab door can at least partially cover the opening of the cab. The linear axis can form an oblique (e.g., acute) angle with the vertical plane that bisects the vehicle.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
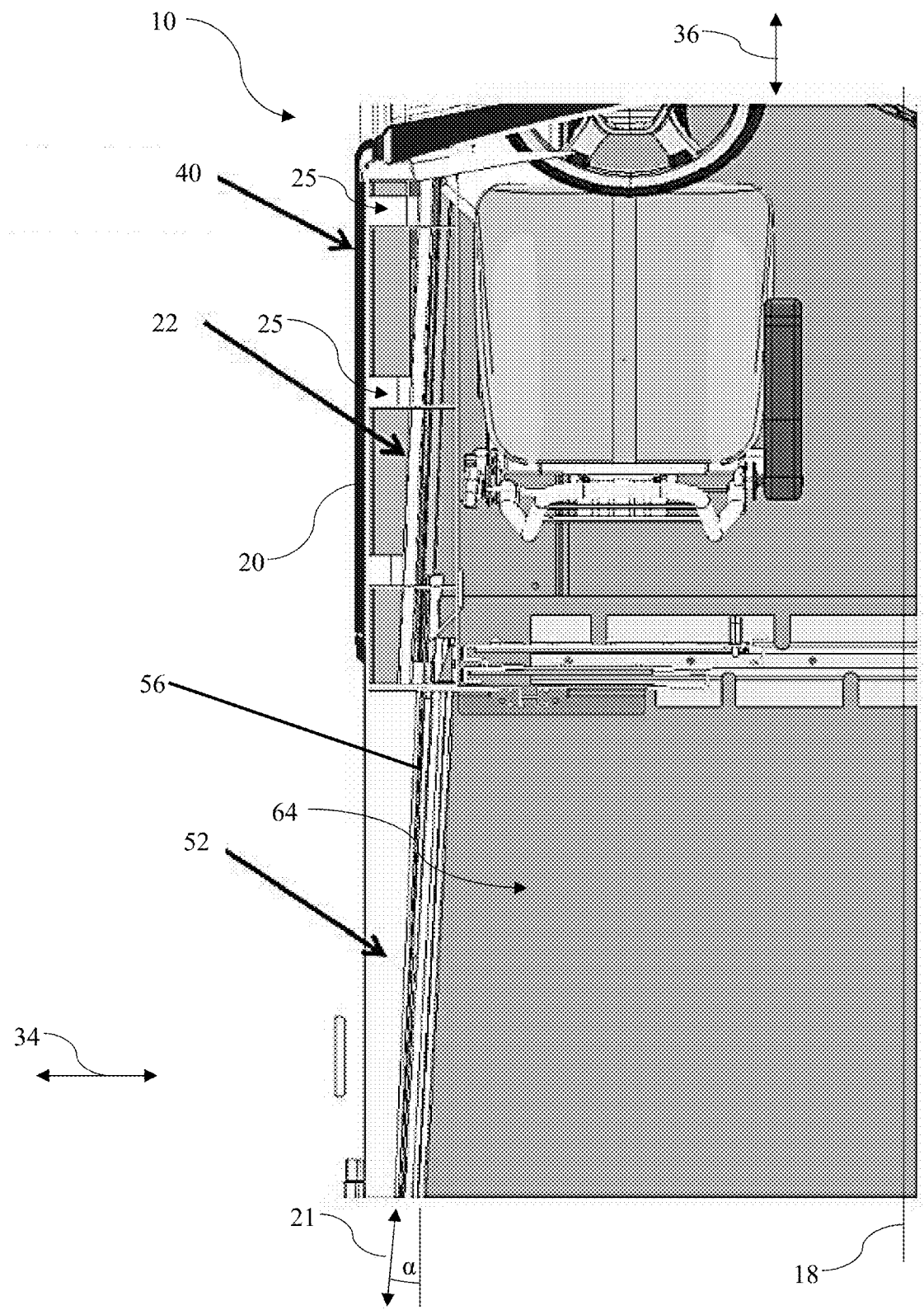
FIG. 1 is a partial top-down view of a vehicle having a sliding door as disclosed herein.

The present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. It is to be understood that this disclosure is not limited to the particular methodology and protocols described, as such may vary. It is also to be understood that the terminology used herein is for the purpose of describing particular embodiments only, and is not intended to limit the scope of the present disclosure.

Many modifications and other embodiments of the disclosure set forth herein will come to mind to one skilled in the art to which the disclosure pertains having the benefit of the teachings presented in the foregoing description and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" include plural referents unless the context clearly dictates otherwise. For example, use of the term "a track" can refer to one or more of such tracks.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Orientations expressed herein as "generally parallel to" can include angles that are within about 10 degrees, or within about 5 degrees, or within about 1 degree of parallel.

As used herein, the terms "optional" or "optionally" mean that the subsequently described event or circumstance may or may not occur, and that the description includes instances where said event or circumstance occurs and instances where it does not.

The word "or" as used herein means any one member of a particular list and, unless context dictates otherwise, can also include any combination of members of that list.

The following description supplies specific details in order to provide a thorough understanding. Nevertheless, the skilled artisan would understand that the apparatus and associated methods of using the apparatus can be implemented and used without employing these specific details.

Indeed, the apparatus and associated methods can be placed into practice by modifying the illustrated apparatus and associated methods and can be used in conjunction with any other apparatus and techniques conventionally used in the industry.

Disclosed herein, in various aspects and with reference to FIGS. 1-8, is a vehicle 10. The vehicle 10 can be a delivery vehicle, such as, for example, a class 2 walk-in vehicle (e.g., a walk-in van). The vehicle 10 can comprise a chassis 12 and a body 13 that is supported by the chassis. The body 13 can define a cab 14. The cab 14 can define an opening 16 configured to provide operator access to the cab (e.g., ingress and egress). For example, the operator can climb through the opening 16 to enter or exit the cab 14. An imaginary vertical plane 18 can bisect the vehicle 10 into a driver's side and an opposed (passenger's) side.

Figure 8:
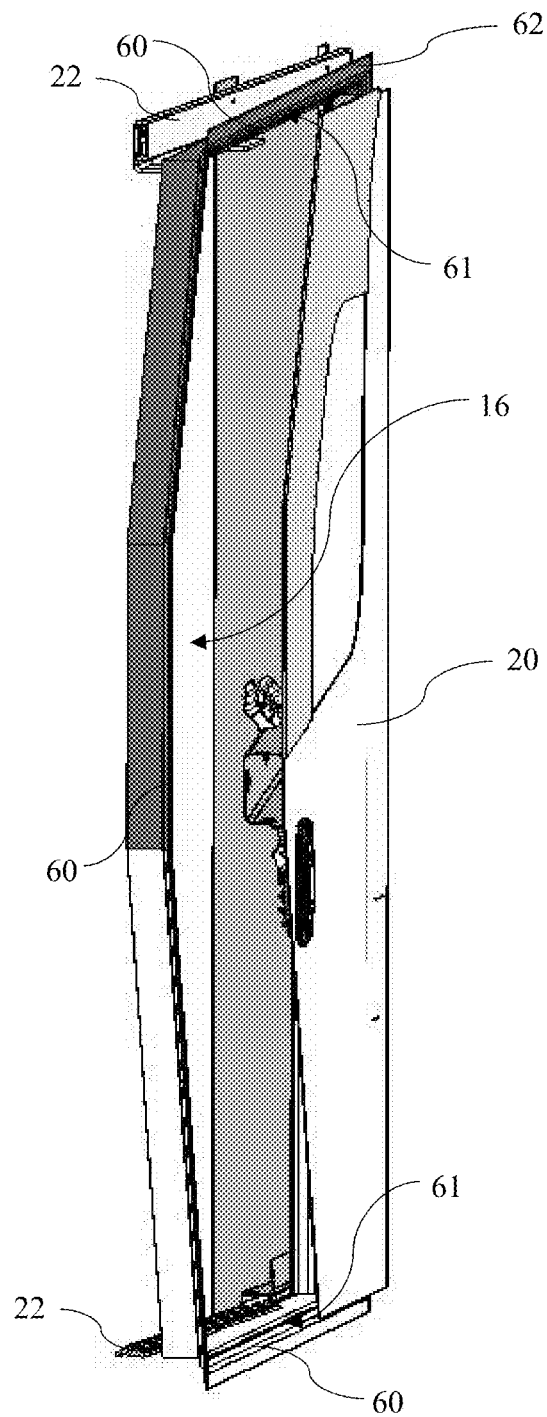
FIG. 8 is a perspective view of the cab door assembly of FIG. 4 in a closed configuration.

The vehicle 10 can have a cab door 20 (e.g., the driver's side cab door) that travels along a linear axis 21 from a first, closed position (FIGS. 1-7) to a second, open position (FIG. 8). That is, along an entirety of the path from the closed position to the open position, the cab door 20 moves along the linear axis 21. In the closed position, the cab door 20 can at least partially cover the opening 16 of the cab 14. The linear axis 21 can be oriented at an acute angle α with respect to a vertical longitudinal plane 18 that bisects the vehicle 10 so that, in the first, closed position, the cab door 20 can be closer to the vertical longitudinal plane than when the cab door is in the second, open position. Thus, in the second, open position, the cab door 12 can be outward of its position when the cab door is in the first, open position. The acute angle between the linear axis 21 and the vertical longitudinal plane 18 can be, for example, from about 5 degrees to about 20 degrees, or from about 5 degrees to about 15 degrees, or about 7.5 degrees.

Referring to FIGS. 1 and 8, in some aspects, the vehicle 10 can comprise at least one seal 60 that is configured to engage the cab door 20 when the cab door is in the closed position. In some aspects, the at least one seal 60 can be coupled to the body 13 so that the seal does not move with the cab door 20 as the cab door moves about and between the open position and the closed position. In alternative aspects, the seal(s) 60 can be coupled to the door and can move with the door. In either configuration, the seal(s) 60 can move into and out of engagement with a sealing surface 61 (i.e., the surface of the cab door 20 or the body 13 against which the seal sealingly engages). The door seal(s) 60 can be in a sealing configuration (e.g., in contact with the sealing surface 61 of the cab door 20 or the body 13) when the cab door is closed. As the cab door 20 moves to the open position, a gap between the sealing surface 61 and the seal(s) 60 forms, and the seal(s) no longer contacts the sealing surface. Said gap can have a spacing along a transverse axis 34 that is perpendicular to the vertical plane 18. Thus, unlike conventional doors that drag against the seals along the entire path from the open position to the closed position, the angled track can permit contact between the seals and the engagement surface 61 (between the cab door 20 and the seals 60 or between the body 13 and the seals) along only a short portion of the path of movement between the open and closed configurations (at and near the closed position of the door). This can reduce the effort required to open and close the cab door 20. Still further, because the seals 60 are not resisting movement of the door along the entire path of movement between the open and closed positions, the seals can be configured to form a tighter seal as the door is closed. As can be understood, a tighter seal configuration with conventional doors would be undesirable because of the force required to move the door against the frictional forces of the seal along the entire path of movement from the open position to the closed position. Moreover, the reduced length of movement of the door 20 between the open and closed positions during which the seals 60 contact the sealing surfaces 61 can prolong the life of the seals.

Figure 3:
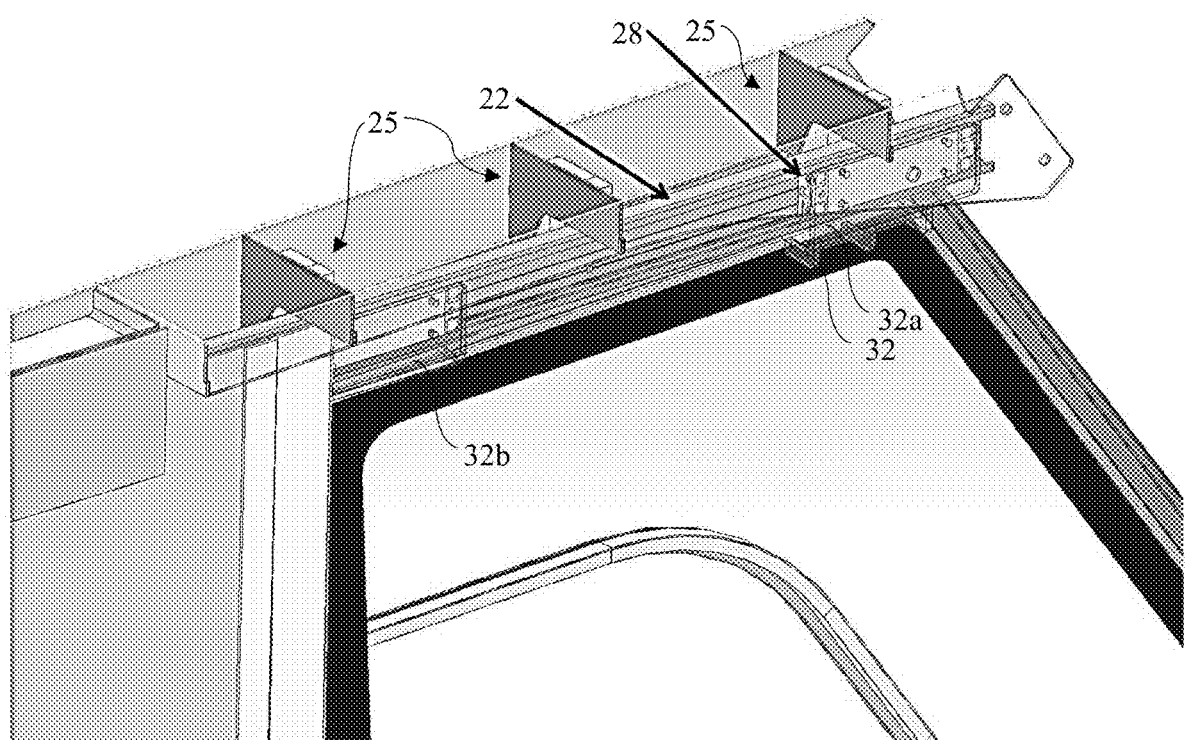
FIG. 3 is a partial perspective interior view of the vehicle as in FIG. 1.
Figure 4:
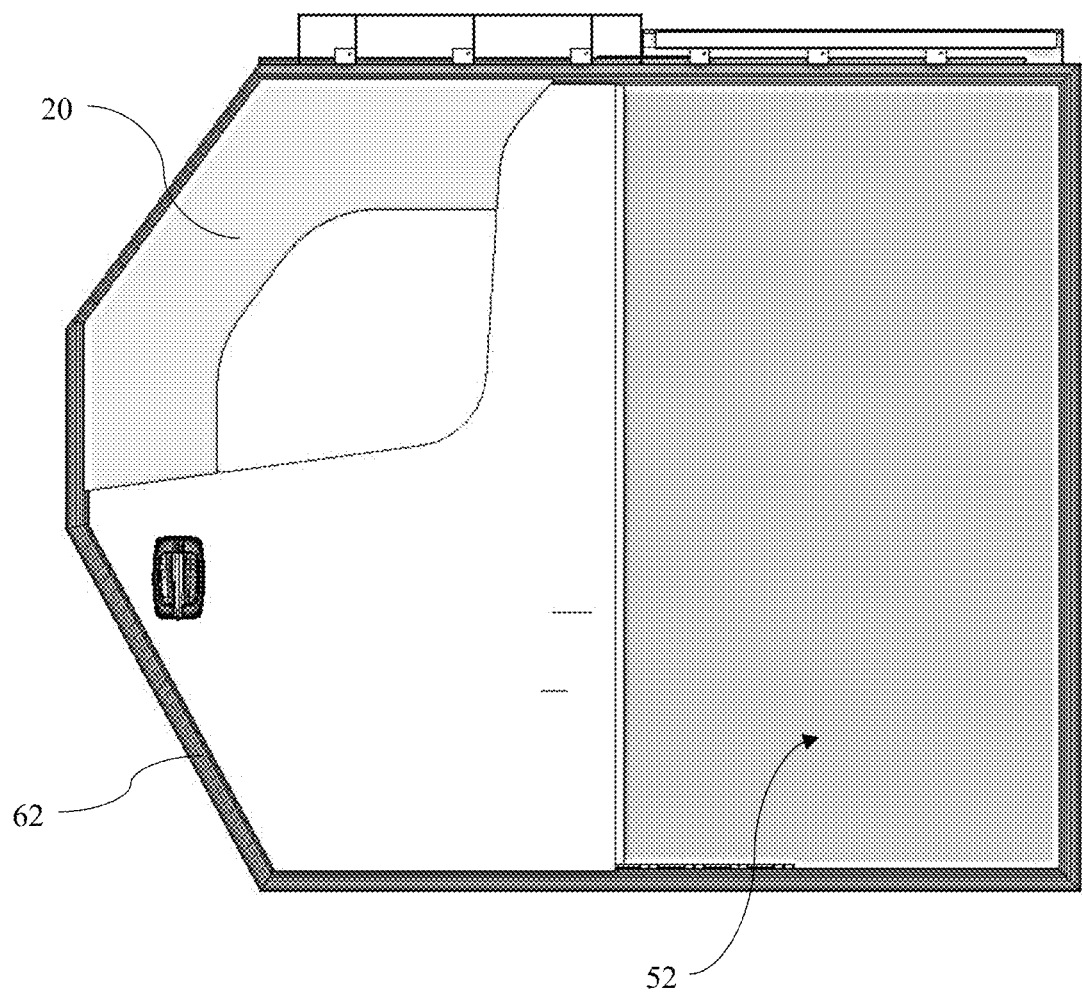
FIG. 4 is an outer side view of a cab door assembly of the vehicle as in FIG. 1.
Figure 5:
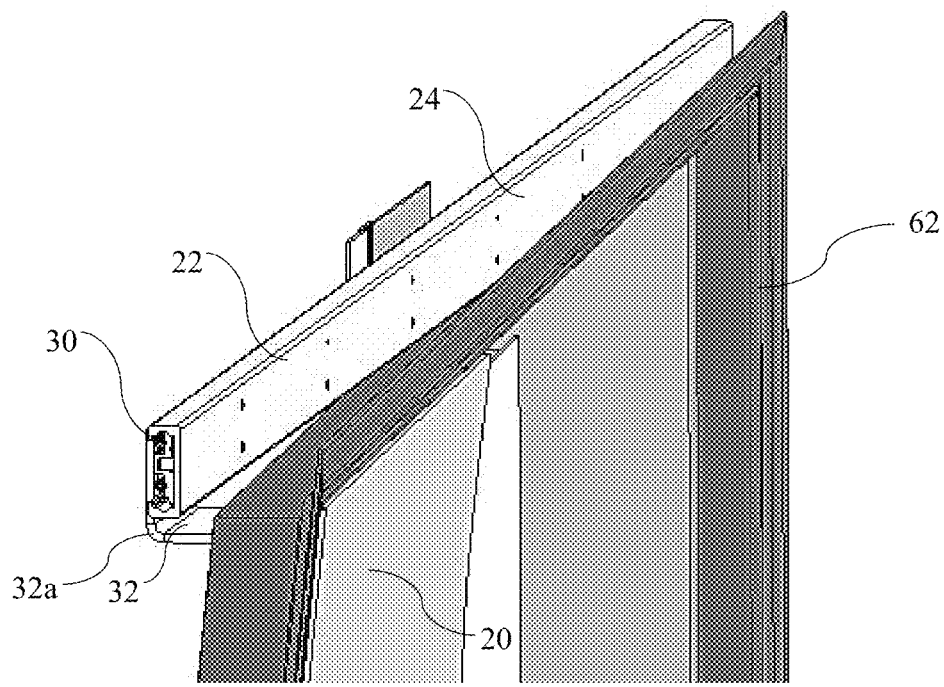
FIG. 5 a partial perspective view of an upper portion of the cab door assembly of FIG. 4.
Figure 6:
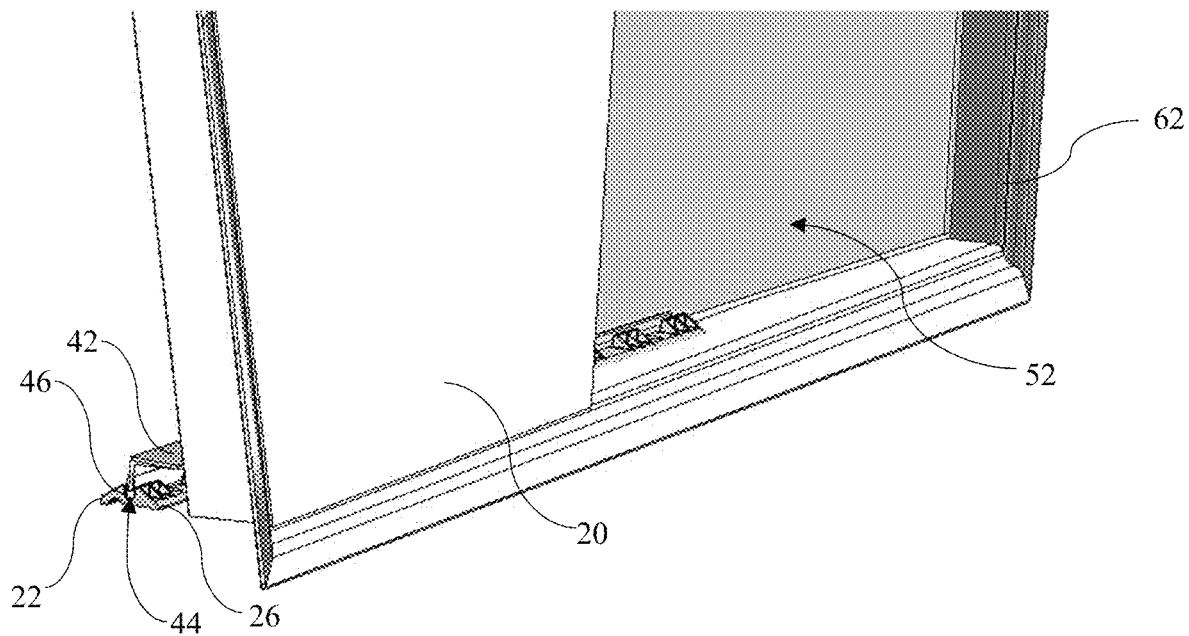
FIG. 6 a partial perspective view of a lower portion of the cab door assembly of FIG. 4.
Figure 7:
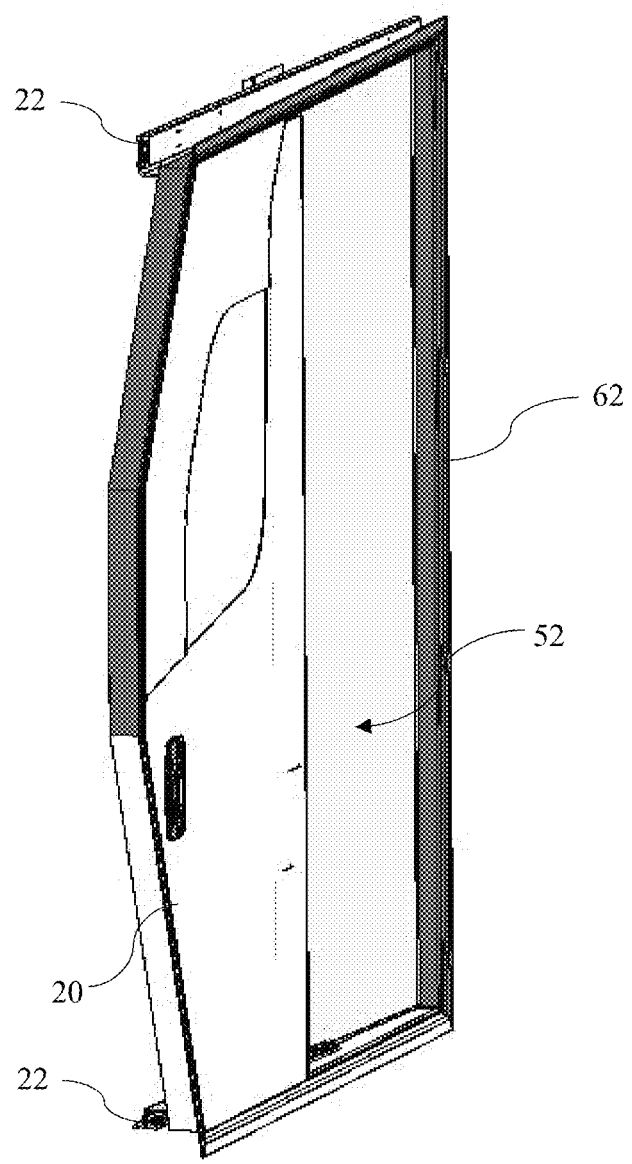
FIG. 7 is a perspective view of the cab door assembly of FIG. 4 in an open configuration.

Referring to FIGS. 3, 5, and 6, the cab door 20 can travel along at least one track 22. The orientation of the at least one track 22 can define the linear axis 21. That is, the track(s) 22 can extend along the linear axis 21 so that the door, moving along the track(s), moves along the linear axis. Optionally, cab door 20 can slide along an upper track 24 that movably couples to an upper portion of the cab door and a lower track 26 that movably couples to a lower portion of the cab door. In exemplary aspects, the upper track 24 can couple to the body by a plurality of brackets 25.

One or more carriages 28 can travel along the upper track 24 via roller bearings 30, and the cab door 20 can couple to the carriages. In this way, the cab door 20 can move more smoothly and quietly and with less operator effort than traditional wheel roller-style door tracks. Further, the tracks and carriages can cooperatively last longer than traditional wheel roller-style door tracks, which can be particularly important for a door that is opened hundreds of times per day (as is the case with the cab door of a walk-in van or other delivery vehicle).

Optionally, the cab door 12 can couple to the carriages 28 via brackets (e.g., upper support brackets 32 and lower support bracket(s) 42, further described herein) so that the door is held parallel to or generally parallel to the sidewall of the vehicle. In further aspects, the cab door 12 can couple to the carriages via brackets so that the door is held parallel to or generally parallel to the vertical longitudinal plane 18 that bisects the vehicle. For example, the brackets can space the door from respective carriages by a longer distance along the transverse axis 34 toward the front of the vehicle 10 and shorter distance toward the rear of the vehicle. Thus, in some aspects, the cab door 20 can have an outer surface 40. At least a portion of the outer surface of the cab door 20 can be generally planar. For example, at least 50%, at least 60%, at least 70%, at least 80%, at least 90%, or all or substantially all of the cab door can be planar. In some aspects, the outer surface 40 of cab door 20, or the portion of the outer surface of the cab door that is generally planar, can be parallel to or generally parallel to the vertical plane that bisects the vehicle. In further aspects, in at least some (optionally, all) horizontal cross sectional planes, the outer surface 40 of the cab door 20 can define lines or edges that are parallel to or generally parallel to the vertical longitudinal plane 18 that bisects the vehicle 10.

Referring to FIGS. 1 and 3, in exemplary aspects, the vehicle 10 can comprise a plurality of upper support brackets 32 that couple the cab door 20 to the upper track 24. The upper support brackets 32 can comprise a first upper support bracket 32a that is configured to maintain a first spacing between cab door 20 and the upper track 24 along the transverse axis 34 (FIG. 1) that is perpendicular to the vertical plane 18. A second upper support bracket 32b can be configured to maintain a second spacing between cab door 20 and the upper track 24 along the transverse axis 34. The second spacing can be less than the first spacing. The first upper support bracket 32a can be positioned forwardly of the second upper support bracket 32b along a longitudinal axis 36 of the vehicle 10 that is parallel to the vertical plane 18. In this way, a front portion of the cab door 20 can be held outwardly relative to a rear portion of the cab door. In this way, the outer surface 40 of the cab door 20 can be held parallel to or generally parallel to the vertical plane 18.

In some aspects, at least one lower support bracket 42 can be coupled to the cab door 20. The lower track 26 can define a slot 44. A portion 46 of the lower support bracket 42 can be received within the slot 44 and can be slidable therealong.

Figure 2:
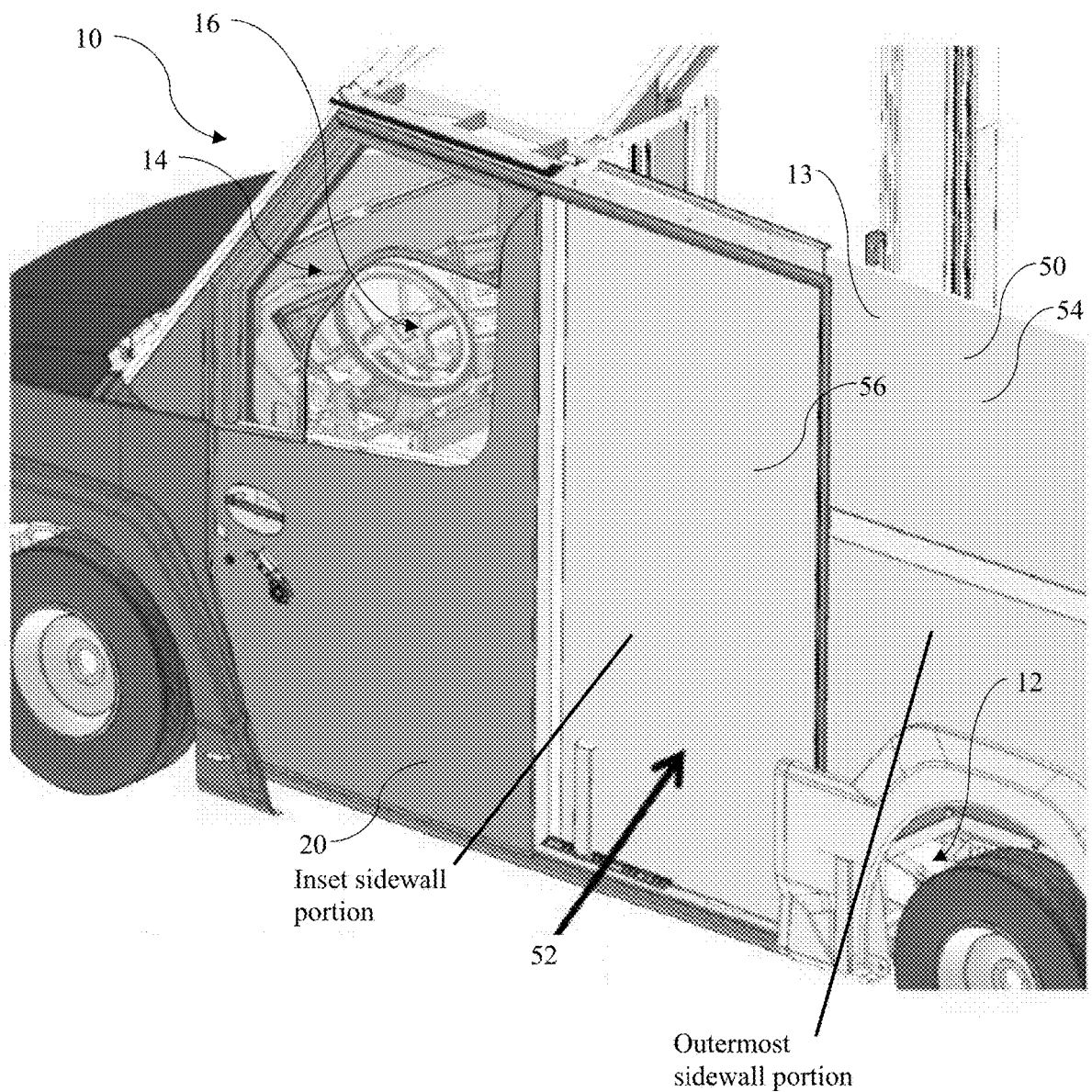
FIG. 2 is a partial perspective view of the vehicle as in FIG. 1.

Referring to FIGS. 1-2, the body 13 of the vehicle 10 can comprise a sidewall 50. The sidewall 50 of the body 13 can define a recess 52 (e.g., a pocket) that can at least partially receive the cab door 20 when the cab door is in the open position.

For example, the sidewall 50 can comprise an outermost sidewall portion 54, and the recess 52 can extend inwardly from the outermost sidewall portion toward the vertical plane 18 that bisects the vehicle. The sidewall 50 can further comprise an inset portion 56 that defines an inner surface of the recess. The inset portion 56 can optionally form an acute angle with the vertical plane 18. For example, the inset portion 56 can optionally form the same acute angle with the vertical plane 18 as the linear axis 21. The inset portion 56 of the sidewall 50 can be angled outwardly in a direction from the front of the vehicle to the rear so that a rear end of the inset portion of the sidewall is outward of a front portion of the inset portion. It is contemplated that the inset portion 56 can define an outer surface of the vehicle 10. In these aspects, the inset portion 56 is not covered by a separate outer wall.

In some aspects, the track(s) 22 can be at least partially positioned within the recess 52. Thus, the tracks 22 can be outward of the inset portion 56 of the sidewall 50 of the body 13 of the vehicle 10 but inward of the outermost portion 54 of the sidewall. It is contemplated that maintaining the tracks 22 within a covered space of the recess 52 can permit long life of the carriages 28. That is, unlike conventional rollers that conventional van doors slide, exposure of the carriages 28 to elements such as water can be significantly detrimental to the carriages' usable life. Accordingly, providing the covered space of the recess 52 can extend the lifespan of the carriages 28.

In some aspects, the body 13 can further define a walk-in compartment 64 behind the cab 14.

By traveling along the linear axis 21 that is angled with respect to the vertical longitudinal plane 18, the recess 52 that at least partially receives the tracks 22 can have a minimized depth (i.e., a dimension with respect to the transverse axis 34 that is perpendicular to the vertical longitudinal plane that bisects the vehicle). That is, the protrusion into the walk-in compartment 64 of the inset portion 56 of the sidewall can decrease in a direction toward the rear of the vehicle. In minimizing the transverse dimension of the recess 52, space within the vehicle can be maximized for receiving cargo. In various aspects, the depth of the recess 52 can be determined as a function of a thickness of the door plus a clearance (e.g., about 0.25 to 0.5 inches) between the door and the sidewall of the vehicle.

Referring to FIGS. 4-8, in some aspects, the body 13 of the vehicle 10 can comprise a door jamb 62. The door jamb 62 can at least partially define the opening 16. The cab door 20 can be coupled to the door jamb 62.

The disclosed cab door 12 and vehicle 10 can require minimized effort in opening and closing the cab door, thereby reducing operator fatigue.

Although the foregoing invention has been described in some detail by way of illustration and example for purposes of clarity of understanding, certain changes and modifications may be practiced within the scope of the appended claims.

What is claimed is:

1. A vehicle having a vertical plane that bisects the vehicle into a driver's side and an opposed side, the vehicle comprising:
   a chassis;
   a body supported by the chassis, wherein the body defines a cab, wherein the cab defines an opening configured to provide operator access to the cab;
   at least one track;
   a cab door that is configured to travel along the at least one track about and between an open position and a closed position along a linear axis, wherein the cab door is configured to move parallel to the linear axis from the open position to the closed position, wherein, in the closed position, the cab door at least partially covers the opening of the cab, wherein the linear axis forms an acute angle with the vertical plane that bisects the vehicle,
   wherein the at least one track comprises an upper track and a lower track,
   wherein the vehicle further comprises a plurality of upper support brackets that couple the cab door to the upper track, wherein the plurality of upper support brackets comprise at least:
      a first upper support bracket that is configured to maintain a first spacing between the cab door and the upper track along a transverse axis that is perpendicular to the vertical plane; and
      a second upper support bracket that is configured to maintain a second spacing between the cab door and the upper track along the transverse axis, wherein the second spacing is less than the first spacing.

2. The vehicle of claim 1, further comprising at least one carriage that is configured to engage and move along the upper track, wherein the at least one carriage comprises at least one roller bearing that is configured to facilitate movement between the upper track and the carriage.

3. The vehicle of claim 2, wherein the at least one carriage comprises a plurality of carriages that are spaced along the linear axis.

4. The vehicle of claim 1, further comprising a lower support bracket that is coupled to the cab door, wherein the lower track comprises a slot, wherein a portion of the lower support bracket is received within the slot and slidable therealong.

5. The vehicle of claim 1, wherein the cab door has an outer surface, wherein at least a portion of the outer surface of the cab door is generally planar.

6. The vehicle of claim 5, wherein the at least a portion of the outer surface of the cab door that is generally planar is parallel to or generally parallel to the vertical plane that bisects the vehicle.

7. The vehicle of claim 1, wherein the acute angle is between 5 and 15 degrees.

8. The vehicle of claim 1, wherein the body comprises a sidewall, wherein the sidewall comprises an outermost sidewall portion, wherein the sidewall defines a recess that extends inwardly toward the vertical plane that bisects the vehicle.

9. The vehicle of claim 8, further comprising at least one track, wherein the cab door is movable along the track, wherein the at least one track is at least partially positioned within the recess.

10. The vehicle of claim 1, further comprising a seal that is configured to seal between the cab door and the body when the cab door is in the closed position.

11. The vehicle of claim 10, wherein the seal is fixedly coupled to the body so that the seal does not move with the cab door as the cab door moves about and between the open position and the closed position.

12. The vehicle of claim 10, wherein the seal is fixedly coupled to the cab door so that the seal moves with the cab door as the cab door moves about and between the open position and the closed position.

13. The vehicle of claim 1, wherein the body comprises a door jamb, wherein the door jamb at least partially defines the opening, wherein the cab door is coupled to the door jamb.

14. The vehicle of claim 1, wherein the vehicle is a class 2 vehicle.

15. The vehicle of claim 1, wherein the body further defines a walk-in compartment behind the cab.

* * * * *